(12) United States Patent
Chen

(10) Patent No.: US 10,449,715 B2
(45) Date of Patent: Oct. 22, 2019

(54) STEREOLITHOGRAPHY COLOR 3D PRINTING METHOD

(71) Applicants: XYZPRINTING, INC., New Taipei (TW); KINPO ELECTRONICS, INC., New Taipei (TW)

(72) Inventor: Peng-Yang Chen, New Taipei (TW)

(73) Assignees: XYZPRINTING, INC., New Taipei (TW); KINPO ELECTRONICS, INC., New Taipei (TW)

( * ) Notice: Subject to any disclaimer, the term of this patent is extended or adjusted under 35 U.S.C. 154(b) by 0 days.

(21) Appl. No.: 16/014,898

(22) Filed: Jun. 21, 2018

(65) Prior Publication Data

US 2019/0210275 A1  Jul. 11, 2019

(30) Foreign Application Priority Data

Jan. 5, 2018 (CN) .......................... 2018 1 0010815

(51) Int. Cl.
*B29C 64/135* (2017.01)
*B29C 64/393* (2017.01)
(Continued)

(52) U.S. Cl.
CPC ............ *B29C 64/135* (2017.08); *B29C 64/20* (2017.08); *B29C 64/393* (2017.08); *B41J 2/01* (2013.01); *G05B 15/02* (2013.01); *G06T 15/10* (2013.01)

(58) Field of Classification Search
CPC ... B29C 64/135; B29C 64/393; B29C 64/264; B29C 64/336; G05B 15/02; G06T 15/10; B41J 2/01; B33Y 10/00; B33Y 30/00
(Continued)

(56) References Cited

U.S. PATENT DOCUMENTS 4,575,330 A * 3/1986 Hull ...................... G03F 7/0037
156/58
2017/0217103 A1* 8/2017 Babaei ................... B33Y 10/00

FOREIGN PATENT DOCUMENTS

CN          106313566 A       1/2017
WO          2015152744 A1     10/2015
WO     WO-2015152744 A1 *    10/2015   ............. B33Y 10/00

OTHER PUBLICATIONS

Search Report dated Dec. 21, 2018 of the corresponding European patent application.

* cited by examiner

*Primary Examiner* — An H Do
(74) *Attorney, Agent, or Firm* — Chun-Ming Shih; HDLS IPR SERVICES

(57) ABSTRACT

A stereolithography color 3D printing method applied to a stereolithography color 3D printer (1) having a light module (11), a coloring module (12) and a curing platform (17) is provided. The method is to lower the curing platform (17) a default height (h), operate the light module (11) to irradiate stereolithography materials (180) on the curing platform (17) for curing the stereolithography materials (180) and manufacturing one layer of slice physical model (182, 30, 31) according to one layer of object print data, operate the coloring module (12) to color the slice physical model (182, 30, 31), and perform above-mentioned operations repeatedly until a color 3D physical model has been manufactured. Therefore, better printing performance can be achieved and colored 3D physical model with high definition can be manufactured by combining the stereolithography technology with the auto-coloring technology.

7 Claims, 13 Drawing Sheets

(51) Int. Cl.
 *B29C 64/20* (2017.01)
 *G06T 15/10* (2011.01)
 *B41J 2/01* (2006.01)
 *G05B 15/02* (2006.01)
(58) Field of Classification Search
 USPC .................................... 347/14, 15, 101, 107
 See application file for complete search history.

STEREOLITHOGRAPHY COLOR 3D PRINTING METHOD

BACKGROUND OF THE INVENTION

Field of the Invention

The technical field relates to 3D printing method and more particularly related to stereolithography color 3D printing method.

Description of Related Art

Compare to the Fused Deposition Modeling (FDM) 3D printers using thermoplastic materials, such as Polylactic Acid (PLA) materials, the stereolithography 3D printers, such as Digital light processing (DLP) 3D printer or Stereolithography (SLA) 3D printers, having the advantages of high printing performance and high printing resolution.

Although the stereolithography 3D printers of the related art having above advantages, the light curing 3D printers of the related art have only the ability of manufacturing monochromatic 3D physical models, and are unable to achieve user's requirements about color 3D physical models. Thus, there is a need for a more effective solutions.

SUMMARY OF THE INVENTION

The technical field relates to a stereolithography color 3D printing method having ability of manufacturing color 3D physical model via stereolithography technology and auto-coloring technology.

One of the exemplary embodiments, a stereolithography color 3D printing method applied to a stereolithography color 3D printer, the stereolithography color 3D printer comprising a light module, a coloring module and a curing platform, the method comprising following steps of: controlling the curing platform to lower a default height; controlling the light module to irradiate stereolithography materials on the curing platform for curing the stereolithography materials into one layer of slice physical model according to one layer of object print data; controlling the coloring module to color the slice physical model according to the same layer of color print data; and, performing above steps repeatedly for stacking all of the slice physical models as a color 3D physical model.

One of the exemplary embodiments, a stereolithography color 3D printing method applied to a stereolithography color 3D printer, the stereolithography color 3D printer comprising a light module, a coloring module and a curing platform, the method comprising following steps of: controlling the curing platform to lower a default height; controlling the coloring module to color stereolithography materials on the curing platform according to one layer of color print data; controlling the light module to irradiate the curing platform for curing the colored stereolithography materials into one layer of slice physical model according to one layer of object print data; and, performing above steps repeatedly for stacking all of the slice physical models as a color 3D physical model.

The present disclosed example can improve printing performance and manufacture a color 3D physical model with high definition via combination of stereolithography technology and auto-coloring technology.

BRIEF DESCRIPTION OF DRAWING

The features of the present disclosed example believed to be novel are set forth with particularity in the appended claims. The present disclosed example itself, however, may be best understood by reference to the following detailed description of the present disclosed example, which describes an exemplary embodiment of the present disclosed example, taken in conjunction with the accompanying drawings, in which:

DETAILED DESCRIPTION OF THE INVENTION

In cooperation with attached drawings, the technical contents and detailed description of the present disclosed example are described thereinafter according to some exemplary embodiments, being not used to limit its executing scope. Any equivalent variation and modification made according to appended claims is all covered by the claims claimed by the present disclosed example.

Figure 1:
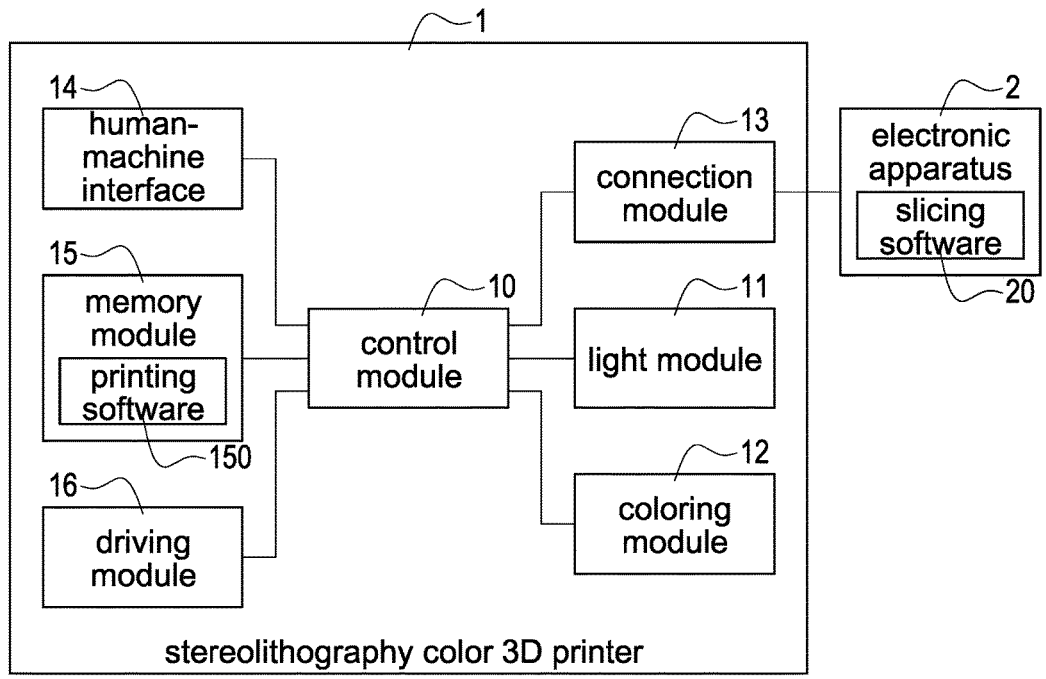
FIG. 1 is an architecture diagram of a 3D printing system according to one embodiment of the present disclosed example.
Figure 2:
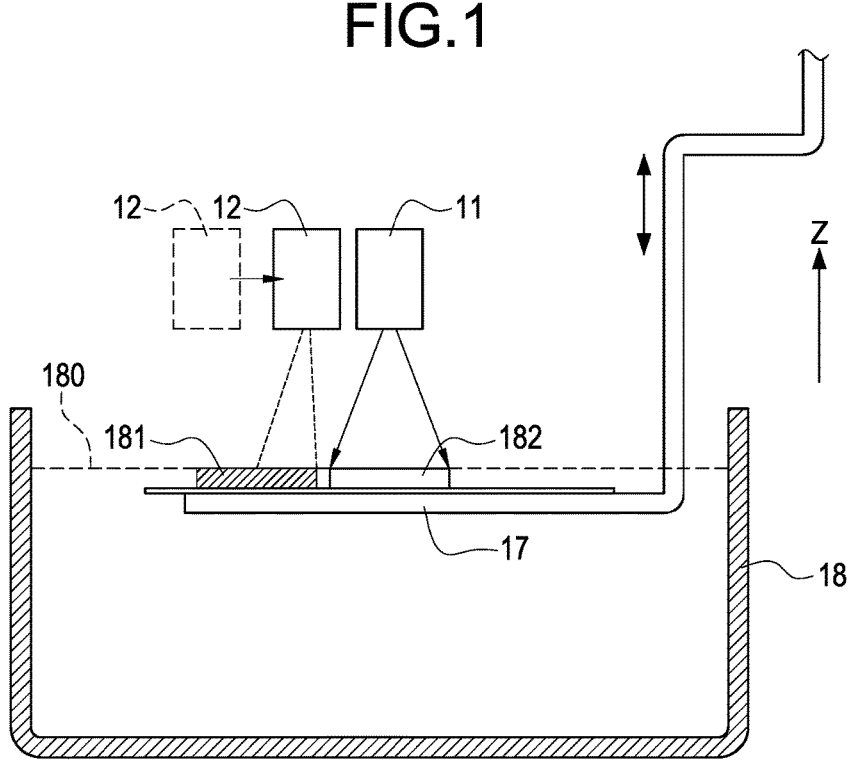
FIG. 2 is a schematic view of a 3D printer according to one embodiment of the present disclosed example.

Please refer to FIG. 1 and FIG. 2 simultaneously, FIG. 1 is an architecture diagram of a 3D printing system according to one embodiment of the present disclosed example, and FIG. 2 is a schematic view of a 3D printer according to one embodiment of the present disclosed example. As shown in figures, a 3D printing system is disclosed in the present disclosed example, the disclosed 3D printing system has ability of printing color 3D physical models via combination of stereolithography technology and auto-coloring technology. The 3D printing system mainly comprises a slicing software 20 used to installed in an electronic apparatus 2 (such as desktop computer, laptop, cloud server or smart phone) and a stereolithography color 3D printer 1 (hereinafter 3D printer 1 for abbreviation).

One of the exemplary embodiments, the slicing process 20 is stored in a memory (not shown in figures) of the electronic apparatus. Above-mentioned memory is a non-transient computer readable, a plurality of computer readable codes is recorded in the slicing software 20. A processor (not shown in figures) of the electronic apparatus 2 may loading color 3D object data corresponding to virtual color 3D object and execute each step of a slicing process described later on the color 3D object data after execution of the slicing software 20.

The 3D printer 1 (such as top exposure stereolithography printer) may comprises light module 11, coloring module 12, connection module 13, human-machine interface 14, memory module 15, drive module 16, and control module 10 electrically connected to above modules. Moreover, the 3D printer 1 further comprise a curing platform 17 and a material tank 18.

The light module 11 is configured to transmits beams heading to one or more designated position(s) of the curing platform 17. One of the exemplary embodiments, the light module is for line light source or surface light source, and is arranged a plurality of light spots. The control module 10 may control the light spots of the light module 11 to light up simultaneously, go out simultaneously, or light spots partially, so as to irradiate a plurality of print positions.

One of the exemplary embodiments, the light module 11 is for single point light source (such as single point laser light emitter). The control module 10 may control a galvanometer module (not shown in figures) to fast change the angles of multiple prisms of the galvanometer module for changing the print positions currently irradiated by the light beam in a very short time (such as 0.01 seconds) and make the light module 11 have ability of simulating the irradiation effect of line light source or surface light source.

One of the exemplary embodiments, the light module 11 and the coloring module 12 is connected to the drive module 16. Via driving by the drive module 16, the light module 11 and the coloring module 12 may be controlled by the control module 10 to irradiate or color the designated position(s) of the curing platform 17.

The coloring module 12 is configured to color stereolithography materials 180 located at the designated position(s) of the curing platform 17 for generating the colored stereolithography materials 180, or color the printed slice physical model(s) 182 for generated the colored slice physical model(s).

One of the exemplary embodiments, the coloring module 12 comprises a plurality of inkjet nozzles and a plurality of ink cartridges of different colors (such as Cyan, Magenta, Yellow, and Black). Each ink cartridge is connected to each inkjet nozzle. Thus, the 3D printer 1 may implement full-color printing via color mixing the inks of different colors.

One of the exemplary embodiments, the coloring module 12 is further connected to a material supply apparatus storing the light-transmissive stereolithography materials or colored stereolithography materials (such as white stereolithography materials or light stereolithography materials). The coloring module 12 may first mix the stored stereolithography materials with the color ink via inkjet technology for generating the stereolithography materials with an expected color and make the colored stereolithography materials flow into the curing platform 17 for becoming the cured slice physical model(s) with the expected color after irradiation.

One of the exemplary embodiments, the coloring module 12 comprises a plurality of material supply apparatuses. each of the material supply apparatuses store the stereolithography materials with the different color respectively. The coloring module 12 may make the stereolithography materials with the different colors flow into the curing platform 17 respectively for curing into the slice physical models with the different colors after irradiation.

The connection module 13, such as USB module, Wi-Fi module, or the other wired/wireless connection module, is configured to connect to an external apparatus, such as electronic apparatus 2 for receipt of data, such as the print data described later.

The human-machine interface, such as buttons, a monitor, indicators, a buzzer, or any combination of above elements, is used to receive a user operation and output the print-related information.

The memory module 15 is configured to store data, such as printing software 150, the printing software 15 may be a firmware or operating system of the 3D printer 1, but this specific example is not intended to limit the scope of the present disclosed example. The control module 10 is configured to control the 3D printer 1.

One of the exemplary embodiments, memory module 15 is a non-transient computer readable recording media, a plurality of computer readable codes is recorded in the printing software 150. After the control module 10 executes the printing software 10, the control module 10 may control the light module 11 and the coloring module 12 to perform each step of printing process described later.

One of the exemplary embodiments, the slicing software 20 may be stored in a memory module 15 of the 3D printer 1. More specifically, the control module 10 may perform each of the steps of the slicing process and the printing process described later after executing the slicing software 20 and the printing software 150.

The drive module 16 is configured to control the light module 11, the coloring module 12, the curing platform 17 and/or the material tank 18 to move in one or more axes (such as moving in the three axis (X-Y-Z) space) for printing.

The material tank 18 is configured to store the stereolithography materials, such as UV curable resins. Above stereolithography materials may be liquid materials and become cured after irradiation. Moreover, above-mentioned stereolithography materials may be the light-transmissive stereolithography materials or the colored stereolithography materials (such as white stereolithography materials or gray stereolithography materials).

Please be noted that, the display technology of the displays having the characteristic of emitting color lights, is based on the RGB color space. The 2D color printing technology is different from the display technology because of the characteristic of absorption of color lights of the inks. For showing the correct colors to human eyes, a CMYK color space (Cyan, Magenta, Yellow and Black) must be applied to the 2D color printing. Moreover, the carrier (such as papers) of the inks must be white or the other light color having ability of reflecting most of color lights.

For Providing the best coloring quality and reducing the chromatic aberration caused by printing, in one of the exemplary embodiments, the present disclosed example prints by using the white stereolithography materials or light-color stereolithography materials (such as the stereolithography materials stored in the material tank 18 or the stereolithography materials provided by the material supply apparatus). Moreover, the inkjet nozzles of the coloring module 12 are respectively connected to the Ink cartridges of CMY (Cyan, Magenta and Yellow) or CMYK (CMY and Black).

The curing platform 17 is connected to the drive module 16 and arranged in the material tank 18. The curing platform 17 is configured to carry the manufactured color 3D physical model, and may be controlled by the control module 10 to lift or lower in the material tank 18 for changing the vertical distance between the liquid surface of the stereolithography materials and the curing platform 17, but this specific example is not intended to limit the scope of the present disclosed example.

One of the exemplary embodiments, the curing platform 17 is arranged fixedly. The material tank 18 is connected to the drive module 16 and may be driven by the drive module 16 to lift or lower for changing the vertical distance between the liquid surface of the stereolithography materials and the curing platform 17.

Figure 3:
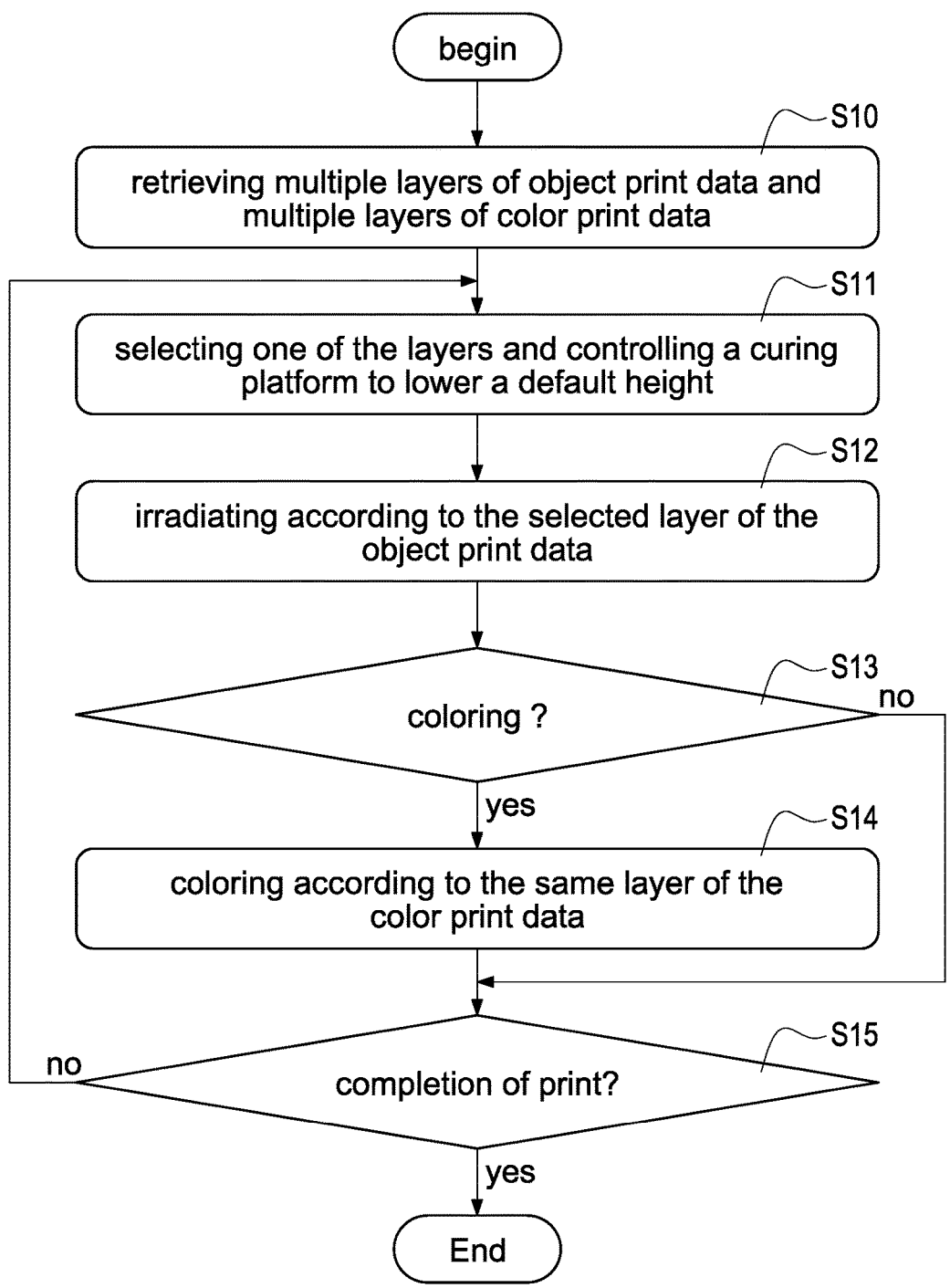
FIG. 3 is a flowchart of a 3D printing method according to a first embodiment of the present disclosed example.
Figure 7A:
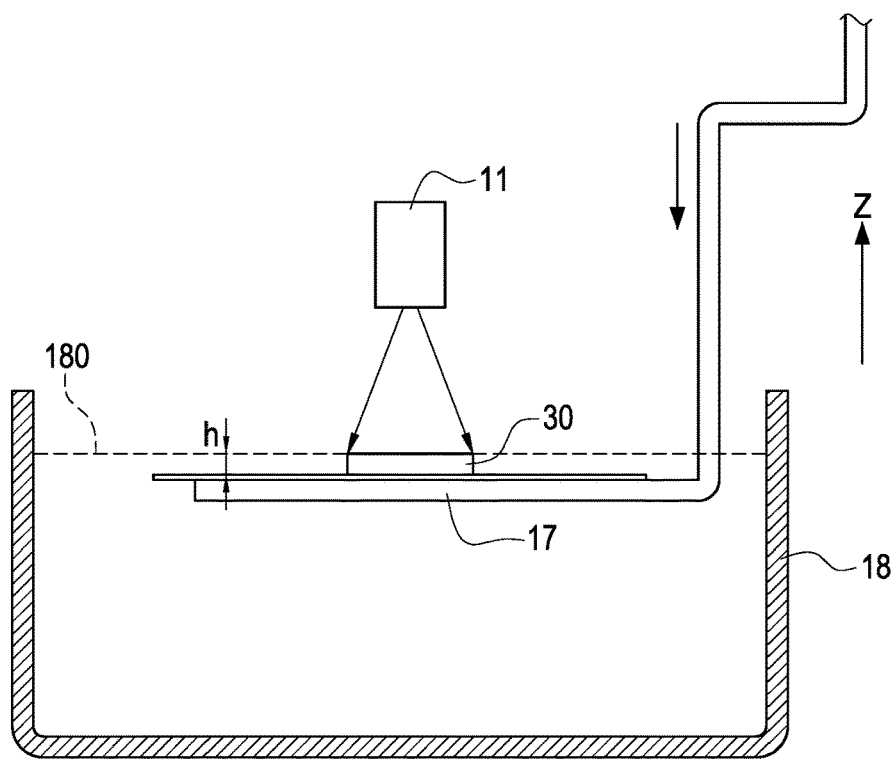
FIG. 7A is a first sectional schematic view of 3D printing according to one embodiment of the present disclosed example.
Figure 7B:
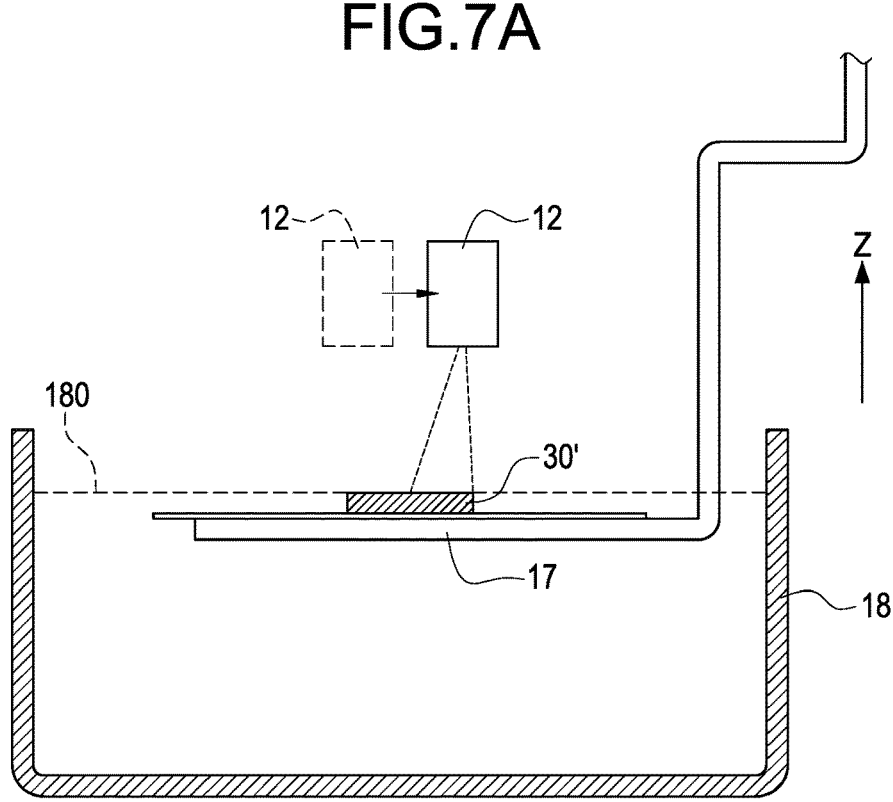
FIG. 7B is a second sectional schematic view of 3D printing according to one embodiment of the present disclosed example.
Figure 7C:
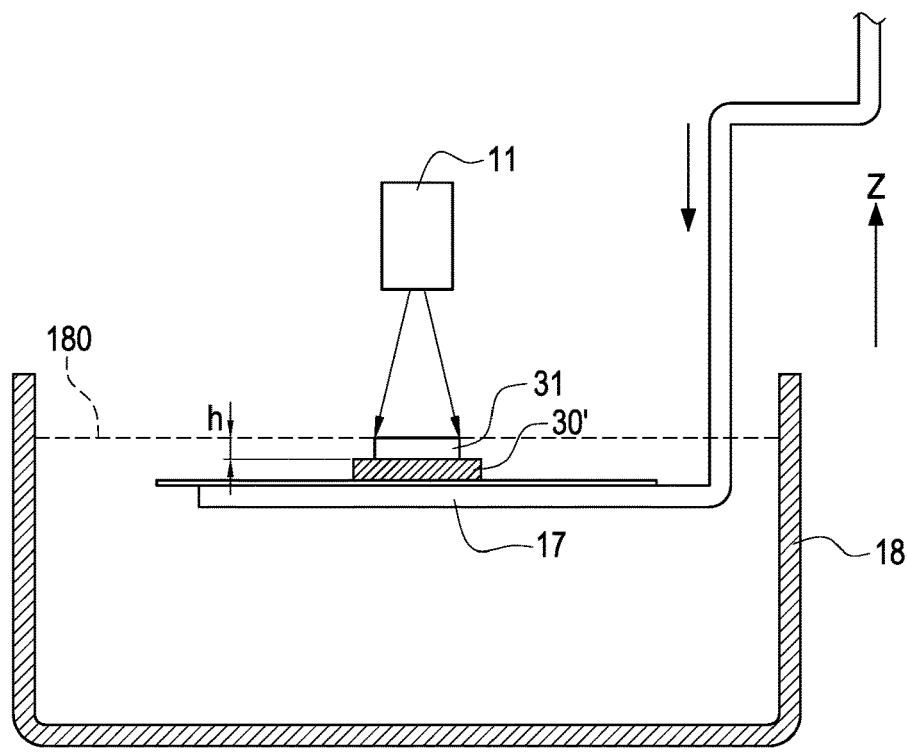
FIG. 7C is a third sectional schematic view of 3D printing according to one embodiment of the present disclosed example.
Figure 7D:
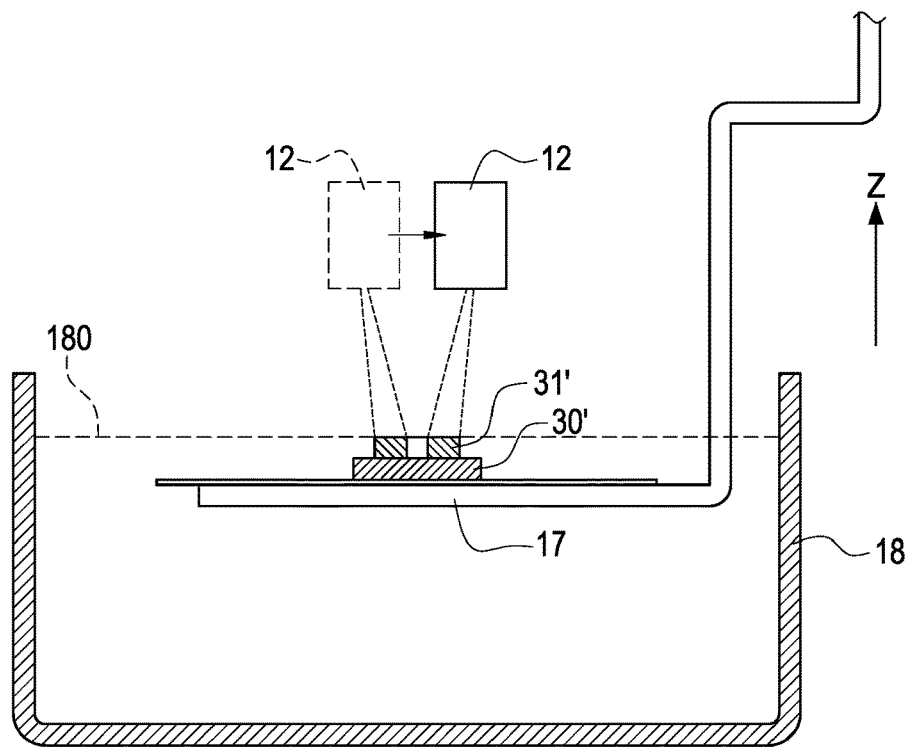
FIG. 7D is a fourth sectional schematic view of 3D printing according to one embodiment of the present disclosed example.
Figure 8A:
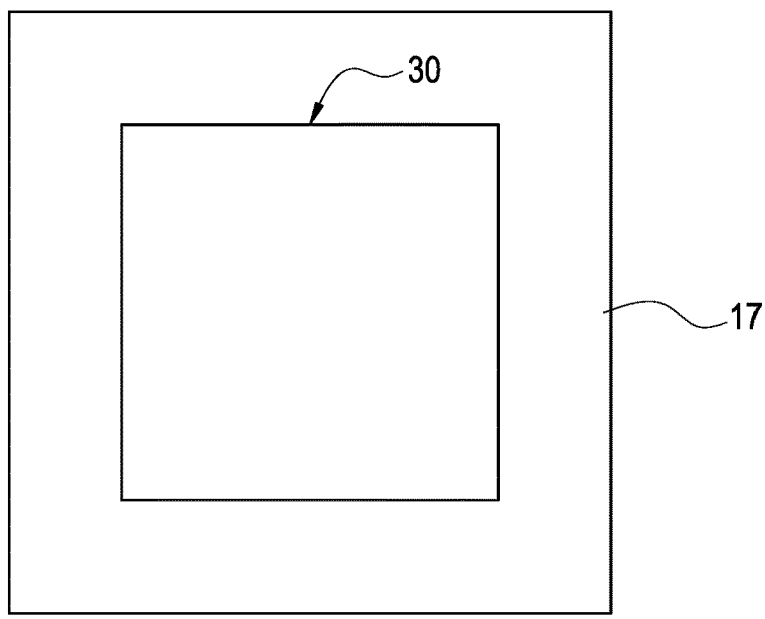
FIG. 8A is a first look-down schematic view of 3D printing according to one embodiment of the present disclosed example.
Figure 8B:
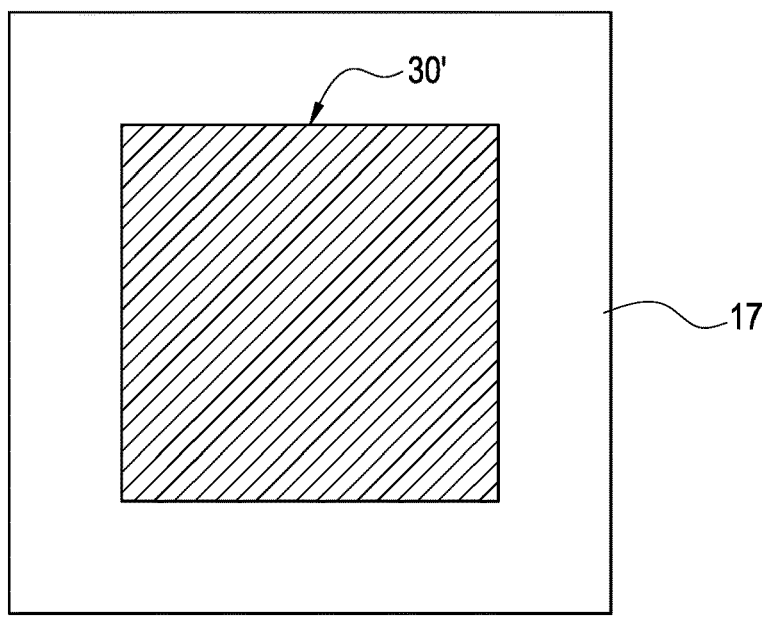
FIG. 8B is a second look-down schematic view of 3D printing according to one embodiment of the present disclosed example.
Figure 8C:
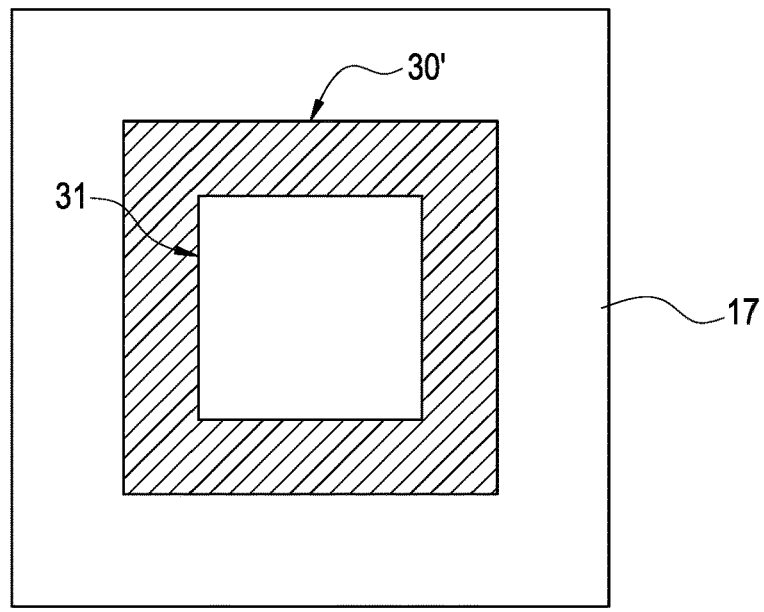
FIG. 8C is a third look-down schematic view of 3D printing according to one embodiment of the present disclosed example.
Figure 8D:
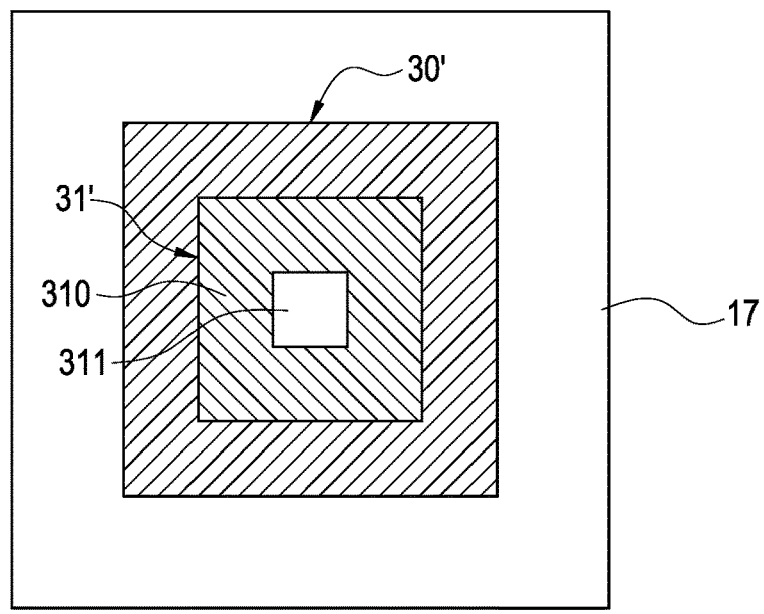
FIG. 8D is a fourth look-down schematic view of 3D printing according to one embodiment of the present disclosed example.

Please refer to FIG. 3 and FIG. 7A-8D simultaneously, FIG. 3 is a flowchart of a 3D printing method according to a first embodiment of the present disclosed example, FIG. 7A is a first sectional schematic view of 3D printing according to one embodiment of the present disclosed example, FIG. 7B is a second sectional schematic view of 3D printing according to one embodiment of the present disclosed example, FIG. 7C is a third sectional schematic view of 3D printing according to one embodiment of the present disclosed example, FIG. 7D is a fourth sectional schematic view of 3D printing according to one embodiment of the present disclosed example, FIG. 8A is a first look-down schematic view of 3D printing according to one embodiment of the present disclosed example, FIG. 8B is a second look-down schematic view of 3D printing according to one embodiment of the present disclosed example, FIG. 8C is a third look-down schematic view of 3D printing according to one embodiment of the present disclosed example, and FIG. 8D is a fourth look-down schematic view of 3D printing according to one embodiment of the present disclosed example. A stereolithography color 3D printing method of each embodiment of the present disclosed example may be implemented by the 3D printing system shown in FIG. 1 or FIG. 2. each step of a printing process of each embodiment of the present disclosed example may be performed by the 3D printer 1 after the 3D printer 1 executes the printing software 150.

The 3D printing method of this embodiment is configured to first print one layer of slice physical model, and then color the layer of printed slice physical model. Compare to the solution of coloring the liquid stereolithography materials directly, this embodiment can effectively prevent the jetted inks from bleeding (unevenly mixing) via coloring the cured slice physical models, so as to improve the fineness of color effectively. The 3D printing method of this embodiment comprises following steps.

Step S10: the control module 10 of the 3D printer 1 loads multiple layers of the object print data and multiple layer of the color print data form the memory module 15.

More specifically, each layer of above mentioned object print data is used to express shape of one layer of the slice object. The 3D printer 1 may manufacture one layer of the slice physical model corresponding to this slice object after the light module 11 irradiates the stereolithography materials 180 on the curing platform 17 according to each layer of the object print data. Moreover, each layer of above mentioned color print data is used to express color distribution of one layer of the slice object. The 3D printer 1 may make the color of the target object correspond to (or match with) the color of the slice object after the coloring module 12 colors the target object (such as the slice physical model or the stereolithography materials) according to each layer of the color print data.

One of the exemplary embodiments, each layer of the object print data and each layer of the color print data comprise a layer number. The control module 10 may determine print order of each layer of the object print data and the object print data according to above layer number. For example, the control module 10 configures the 3D printer 1 to print form the lowest layer number to the highest number.

One of the exemplary embodiments, the 3D printer 1 may receive the multiple layers of the object print data and the multiple layers of the color print data form the electronic apparatus via the connection module 13, and store the received object print data and the received object print data in the memory module 15.

One of the exemplary embodiments, the electronic apparatus 2 may load the color 3D object data corresponding to the color 3D object, and execute a slicing process on the loaded color 3D object data for generating above-mentioned multiple layers of the object print data and multiple layers of the color print data (described later).

Step S11: the control module 10 selects one of the multiple layers of the object print data orderly, and selects the same layer of the color print data. For example, the control module 10 selects the first layer of the object print data and color print data. Then, as shown in FIG. 7A the control module 10 controls the drive module 16 to lower the curing platform 17 for making a (vertical) distance between the plane of the curing platform 17 (the plane of the curing platform 17 may be replace with top of the printed slice physical model(s) if there is any printed slice physical model on the curing platform 17) and the liquid surface of the stereolithography materials be consistent with a default height (such as the default height h shown in FIG. 7, the default height may be 0.1 mm).

Please be noted that above-mentioned default height h may be a fixed default value (namely, the user and the control module 10 cannot arbitrarily modify the default height h), a value inputted and configured by the user, or a value calculated by the control module 10, but this specific example is not intended to limit the scope of the present disclosed example.

For example, the control module 10 may modify the default height h according to sum of all the layers of the object print data and a maximum model height of a maximum model manufactured by the 3D printer 1. Take 200 layers of the object print data and maximum model height being 40 cm for example, the control module 10 may configure the default height h as 0.2 mm.

One of the examples, the control module 10 may calibrate the layer height inputted by the user. Take 200 layers of the object print data and maximum model height being 40 cm for example, the control module 10 may determine that the default height h can't be greater than 0.2 mm. The control module 10 may give an alert via the human-machine interface 14 or calibrate the layer height inputted by the user to 0.2 mm as the default height h if the layer height (such as 0.4 mm) inputted by the user is not consistent with above limitation.

Step S12: the control module 10 controls the light module 11 to irradiate the curing platform 17 for curing the stereolithography materials on the curing platform 17 into one layer of the slice physical model (as the slice physical model 30 shown in FIGS. 7A and 8A) according to the selected layer of the object print data.

One of the exemplary embodiments, each layer of the object print data is a 2D image. The control module 10 adjust luminous flux of each corresponding light spot of the light module 11 according to pixel value of each pixel of the selected 2D image and controls each light spot to irradiate according to each position corresponding to each pixel in the curing platform 17 for manufacturing one layer of slice physical model 30.

One of the exemplary embodiments, a range of pixel values of each layer of the object print data corresponds to a specific number of variety levels of each light spot of the light module 11. The control module 10 selects the corresponding light spot based on the position of each pixel of each layer of the object print data and adjusts the luminous flux of the selected light spot based on the pixel value of each pixel of each layer of the object print data.

For example, if the light module 11 is a binary light module (each spot can only express two variety levels, light up/off), the range of pixel values of the object print data is from 0 to 1. Namely, the object print data may be a halftone image (such as Black and white image). One of the examples, if the light module 11 is a digital light module (each spot can only express 256 variety levels of luminous flux), the range of pixel values of the object print data is from 0 to 255. Namely, the object print data may be an 8 bits gray-scale image.

Step S13: the control module 10 determines whether the printed slice physical model 30 is necessary to be colored according to the same layer of the color print data.

One of the exemplary embodiments, the control module 10 determines that the printed slice physical model 30 is not necessary to be colored if the same layer of the color print data does not exist.

One of the exemplary embodiments, the control module 10 determines that the printed slice physical model 30 is not necessary to be colored if the same layer of the color print data is colorless (such as the layer of the color print data is a transparent 2D image) or only comprises the specific color(s) (such as the layer of the color print data is a white image).

If the control module 10 determines that the layer of the slice physical model 30 is necessary to be colored, a step S14 is performed by the control module 10. Otherwise, the control module 10 performs a step S15.

Step S14: the control module 10 controls the coloring module 12 to color the layer of the printer slice physical model 30 for manufacturing the colored slice physical model (such as the colored slice physical model 30' shown in FIG. 7B and FIG. 8B) according to the same layer of the color print data.

One of the exemplary embodiments, the coloring module 12 comprises a plurality of inkjet nozzles and a plurality of ink cartridges of different colors. Thus, the 3D printer 1 may use the inkjet technology to jet the inks to each position of the printed slice physical model.

One of the exemplary embodiments, the control module 10 controls coloring module 12 to mix the inks with the different colors and jet the mixed inks to the corresponding position of the slice physical model 30 according to color distribution (such as the pixel value of each pixel) of the same layer of the color print data (such as color 2D image).

One of the exemplary embodiments, the control module 10 may adjust area/range of the coloring region according to a position of the slice physical model 30 corresponding to the layer of the color print data in all layers of the color 3D physical model.

For example, the control module 10 controls the coloring module 12 to color whole surface of the layer of the printed slice physical model if determining that the layer of the printed slice physical model is a top layer (the last layer) or a bottom layer (the first layer) according to the color print data. Besides, the control module 10 controls the coloring module 12 to color partial surface (such as outer surface) of the layer of the printed slice physical model if determining that the layer of the printed slice physical model is a middle layer.

In the example shown in FIG. 7A, FIG. 7B, FIG. 8A and FIG. 8B, the slice physical model 30 is the bottom layer, sot the coloring module 12 may color whole surface of the slice physical model 30 to manufacture the colored slice physical model 30'.

Namely, the colored slice physical model 31' comprises a coloring region 310 and a blank region 311. Thus, this embodiment can effectively reduce the coloring time and the used amount of inks via reducing area of coloring region.

Step S15: the control module 10 determines whether the printing had been completed. More specifically, the control module 10 determines whether the printing had been completed according to a layer number of the currently selected layer of the print data (object print data and color print data). Namely, the control module 10 determines whether the currently selected layer of the print data is the last layer of the print data.

The currently selected layer of the print data being the last layer of the print data indicates that all of the layers of the slice physical model had been printed and colored and the colored slice physical model are stacked to be the color 3D physical model.

If the control module 10 determines that the printing had been completed, the 3D printing method is terminated. Otherwise, the control module 10 performs the steps S11-S14 again for selecting the other layer of the print data. For example, The control module 10 selects the second layer of the print data, controls the drive module 16 to lower the curing platform 17 the default height for making a distance between the first layer of the colored slice physical model 30' and the liquid surface be consistent with the default height h, controls the light module 11 irradiate the curing platform 17 for curing the stereolithography materials on the first layer of the slice physical model 30 into the second layer of the slice physical model 31 (as shown in FIG. 7C and FIG.

8C) according to the second layer of the object print data, controls the coloring module 12 to color the second layer of the printed slice physical model 31 for manufacturing the second layer of the colored slice physical model 31' (as shown in FIG. 7D and FIG. 8D).

The present disclosed example can improve printing performance and manufacture a color 3D physical model with high definition via combination of stereolithography technology and auto-coloring technology.

Figure 4:
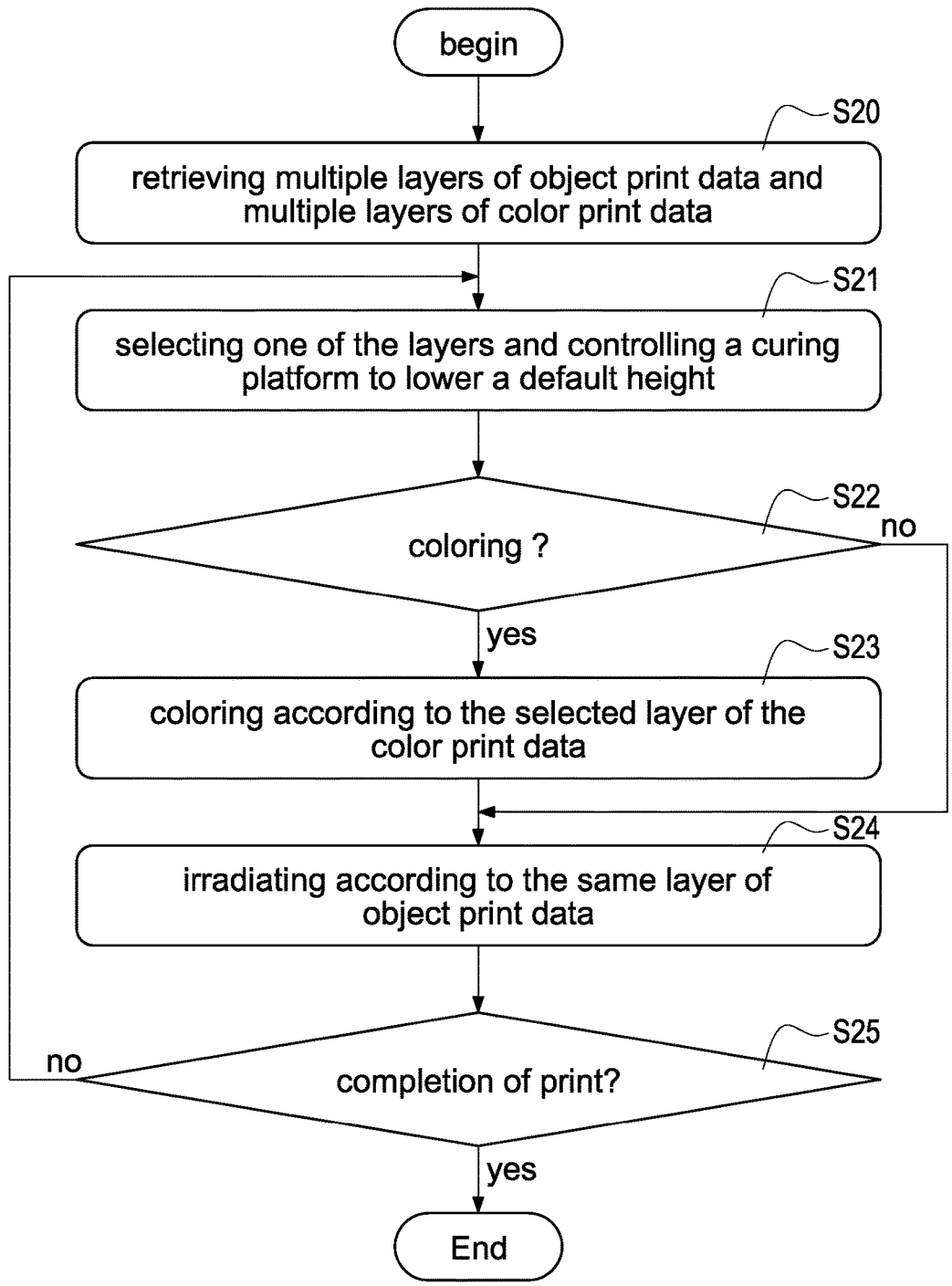
FIG. 4 is a flowchart of a 3D printing method according to a second embodiment of the present disclosed example.
Figure 9A:
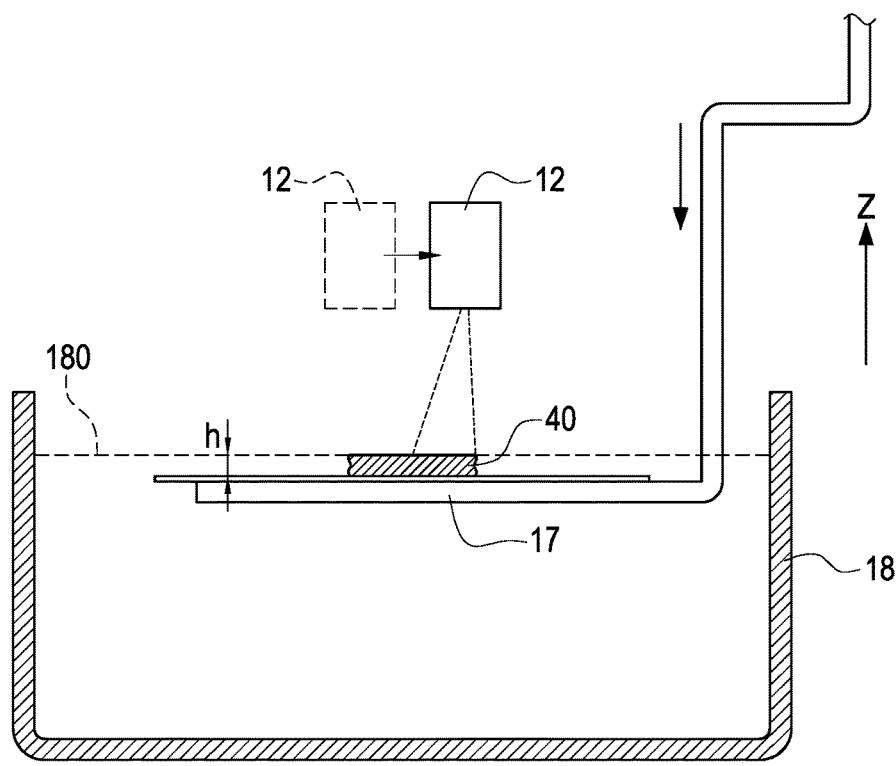
FIG. 9A is a first sectional schematic view of 3D printing according to one embodiment of the present disclosed example.
Figure 9B:
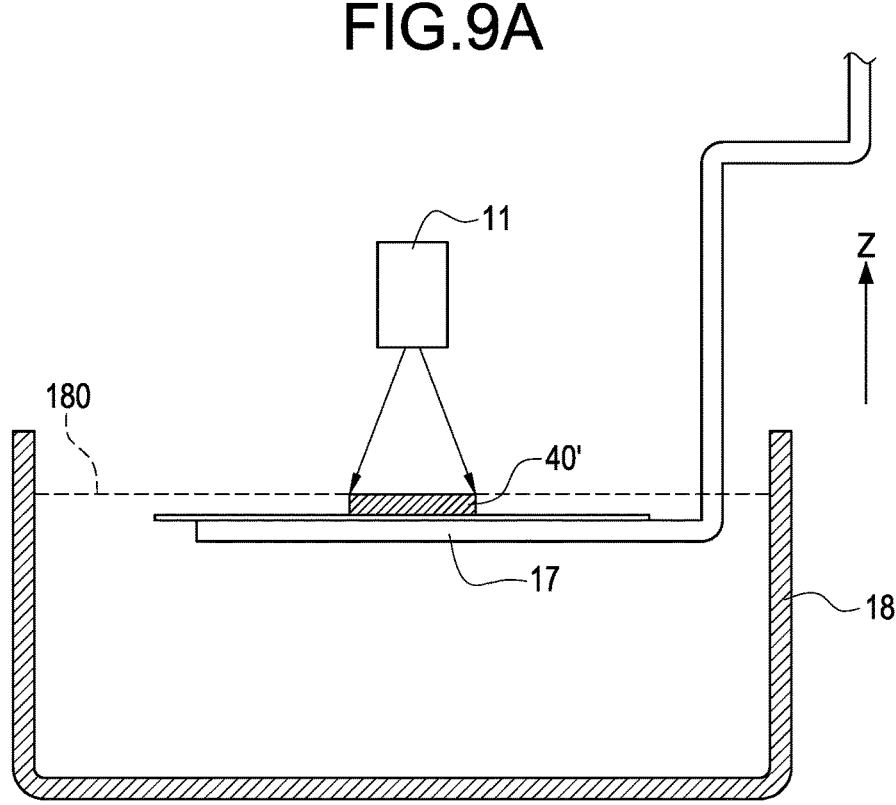
FIG. 9B is a second sectional schematic view of 3D printing according to one embodiment of the present disclosed example.
Figure 9C:
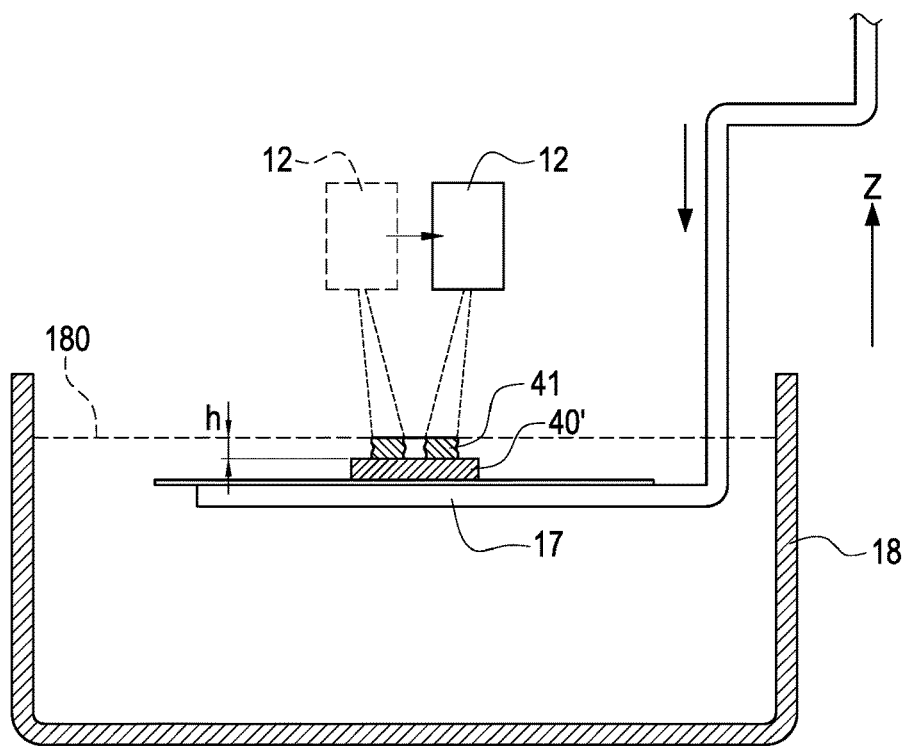
FIG. 9C is a third sectional schematic view of 3D printing according to one embodiment of the present disclosed example.
Figure 9D:
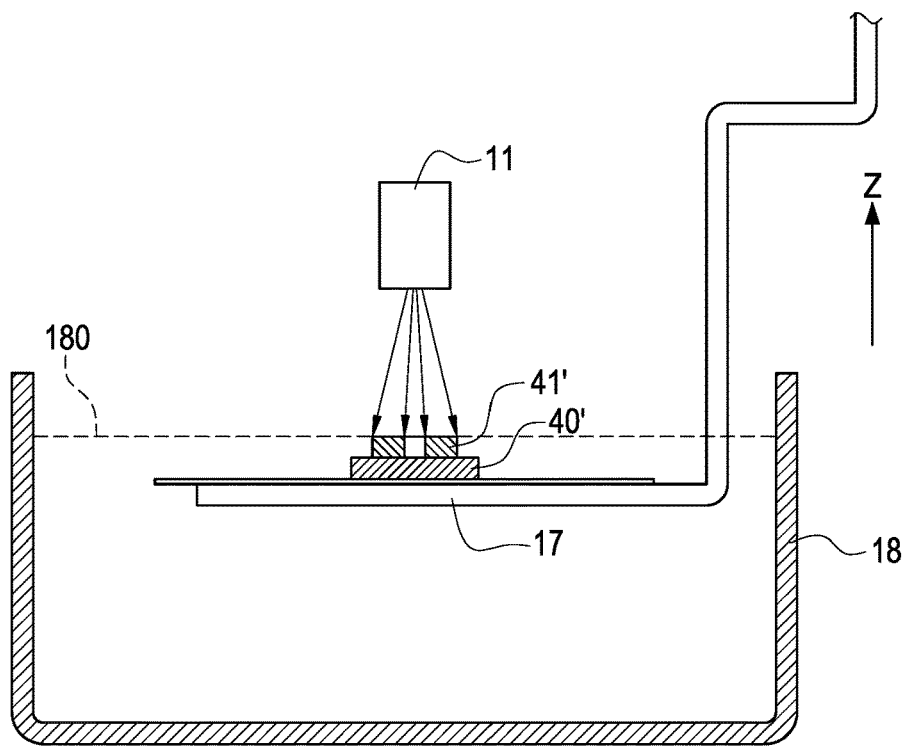
FIG. 9D is a fourth sectional schematic view of 3D printing according to one embodiment of the present disclosed example.
Figure 10A:
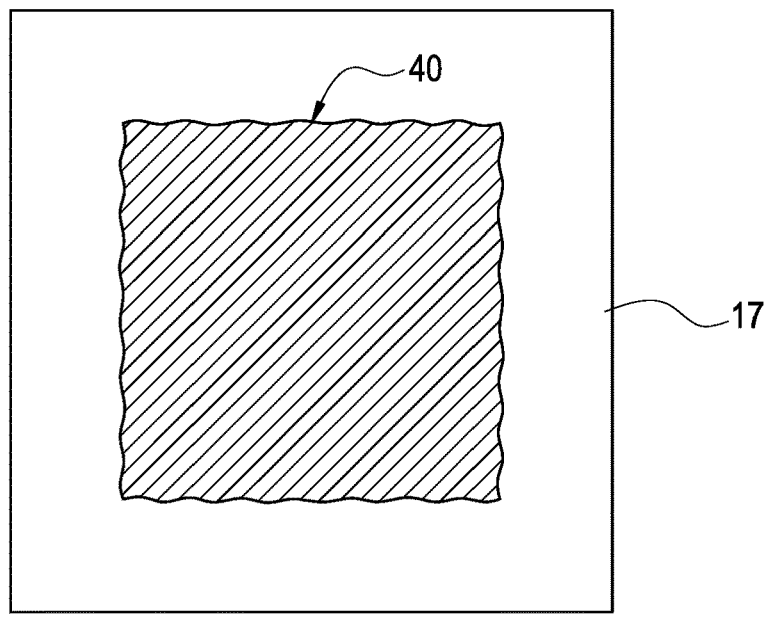
FIG. 10A is a first look-down schematic view of 3D printing according to one embodiment of the present disclosed example.
Figure 10B:
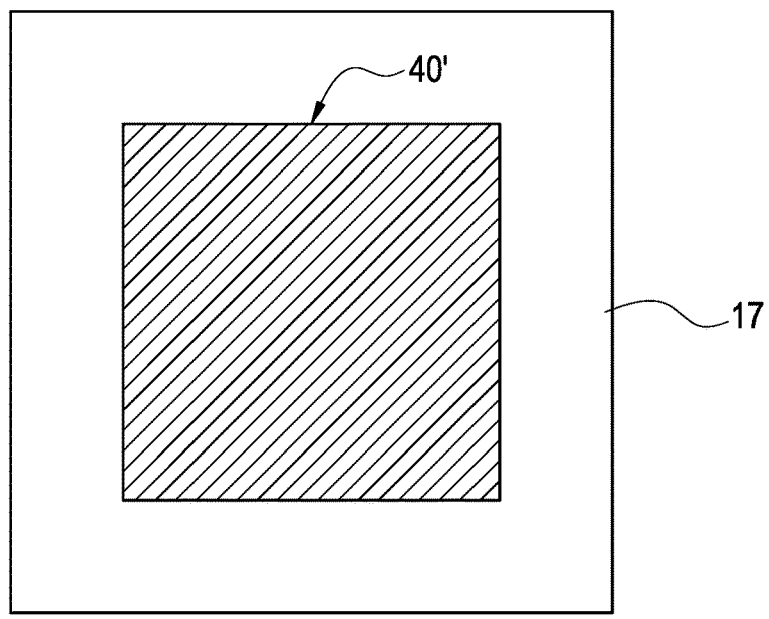
FIG. 10B is a second look-down schematic view of 3D printing according to one embodiment of the present disclosed example.
Figure 10C:
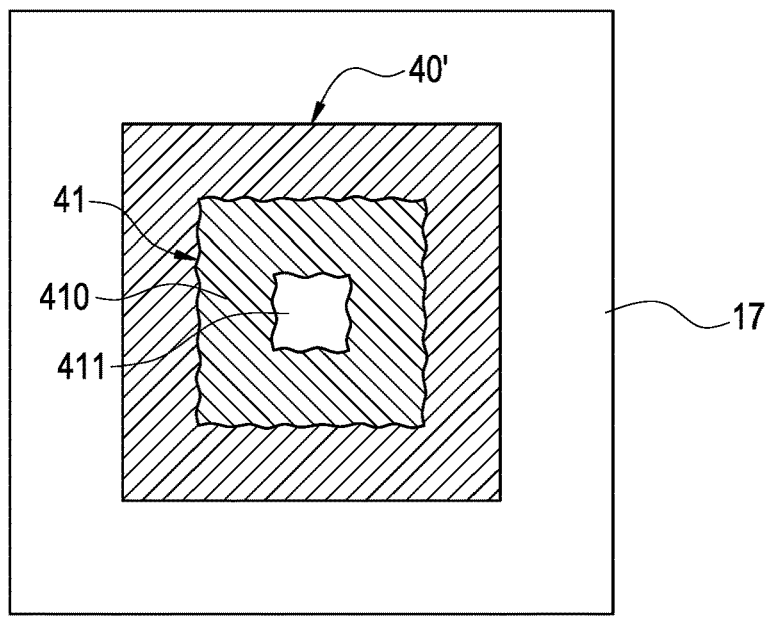
FIG. 10C is a third look-down schematic view of 3D printing according to one embodiment of the present disclosed example.
Figure 10D:
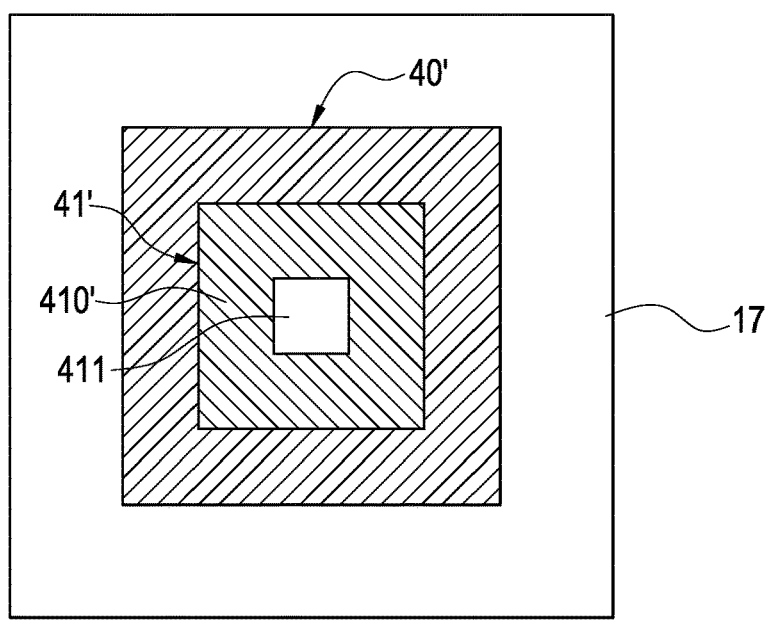
FIG. 10D is a fourth look-down schematic view of 3D printing according to one embodiment of the present disclosed example.

Please refer to FIG. 4 and FIG. 9A-10D simultaneously, FIG. 4 is a flowchart of a 3D printing method according to a second embodiment of the present disclosed example, FIG. 9A is a first look-down schematic view of 3D printing according to one embodiment of the present disclosed example, FIG. 9B is a second sectional schematic view of 3D printing according to one embodiment of the present disclosed example, FIG. 9C is a third sectional schematic view of 3D printing according to one embodiment of the present disclosed example, FIG. 9D is a fourth sectional schematic view of 3D printing according to one embodiment of the present disclosed example, FIG. 10A is a first look-down schematic view of 3D printing according to one embodiment of the present disclosed example, FIG. 10B is a second look-down schematic view of 3D printing according to one embodiment of the present disclosed example, FIG. 10C is a third look-down schematic view of 3D printing according to one embodiment of the present disclosed example, and FIG. 10D is a fourth look-down schematic view of 3D printing according to one embodiment of the present disclosed example.

The 3D printing method of this embodiment is configured to color the stereolithography materials and irradiate the colored stereolithography materials for manufacturing one layer of the colored slice physical model. The cohesive force between each of layers of the slice physical models may be reduced because of the ink coating formed by coloring the cured slice physical model. Compare to the solution of coloring the cured slice physical models, this embodiment can effectively enhance the cohesive force between each of layers of the slice physical models and enhance the strength of color 3D physical model via first coloring the liquid stereolithography materials and then curing the colored stereolithography materials because there is not any ink coating between the slice physical models. The 3D printing method of this embodiment comprises following steps.

Please be noted that the steps S20, S21, S22, S23, S24 and S25 of this embodiment are the same/similar as the step S10, S11, S13, S12, S14 and S15 respectively. The difference between the two embodiments is only the order of execution.

Step S20: the control module 10 loads multiple layers of the object print data and multiple layer of the color print data form the memory module 15.

Step S21: the control module 10 selects one of the multiple layers of the object print data orderly and selects the same layer of the color print data. For example, the control module 10 selects the first layer of the object print data and color print data. Then, the control module 10 control the drive module 16 to lower the curing platform 17 a default height (as shown in FIG. 9A, the curing platform 17 lowering the default height h).

Step S22: the control module 10 determines whether the stereolithography materials on the curing platform 17 are necessary to be colored according to the selected layer of the color print data.

A step S23 is performed by the control module 10 if the control module 10 determines that the stereolithography materials on the curing platform 17 are necessary to be colored. Otherwise, the control module 10 performs a step S24.

Step S23: the control module 10 controls the coloring module 12 to color the stereolithography materials on the curing platform 17 for manufacturing colored stereolithography materials (such as the colored stereolithography materials 40 shown in FIG. 9A and FIG. 10A) according to the same layer of the color print data.

Step S24: the control module 10 controls the light module 11 to irradiate the curing platform 17 for curing the colored stereolithography materials 40 into one layer of the slice physical model (such as the colored slice physical model 40' as shown in FIG. 9B and FIG. 10B) according to the same layer of the object print data.

Step S25: the control module 10 determines whether the printing had been completed. More specifically, the control module 10 determines whether the currently selected layer of the print data is the last layer of the print data.

If the control module 10 determines that the printing had been completed, the 3D printing method is terminated. Otherwise, the control module 10 performs steps S21-S24 again, such as selecting the other layer of the print data. For example, The control module 10 selects the second layer of the print data, controls the drive module 16 to lower the curing platform 17 the default height for making a distance between the first layer of the colored slice physical model 40' and the liquid surface be consistent with the default height h, controls the coloring module 12 to color the second layer of stereolithography materials for manufacturing the second layer of the colored stereolithography materials 41 (as shown in FIG. 9C and FIG. 10C), and controls the light module 11 irradiate the curing platform 17 for curing the colored stereolithography materials 41 into the second layer of the colored slice physical model 41' (as shown in FIG. 9D and FIG. 10D) according to the second layer of the object print data.

Figure 5:
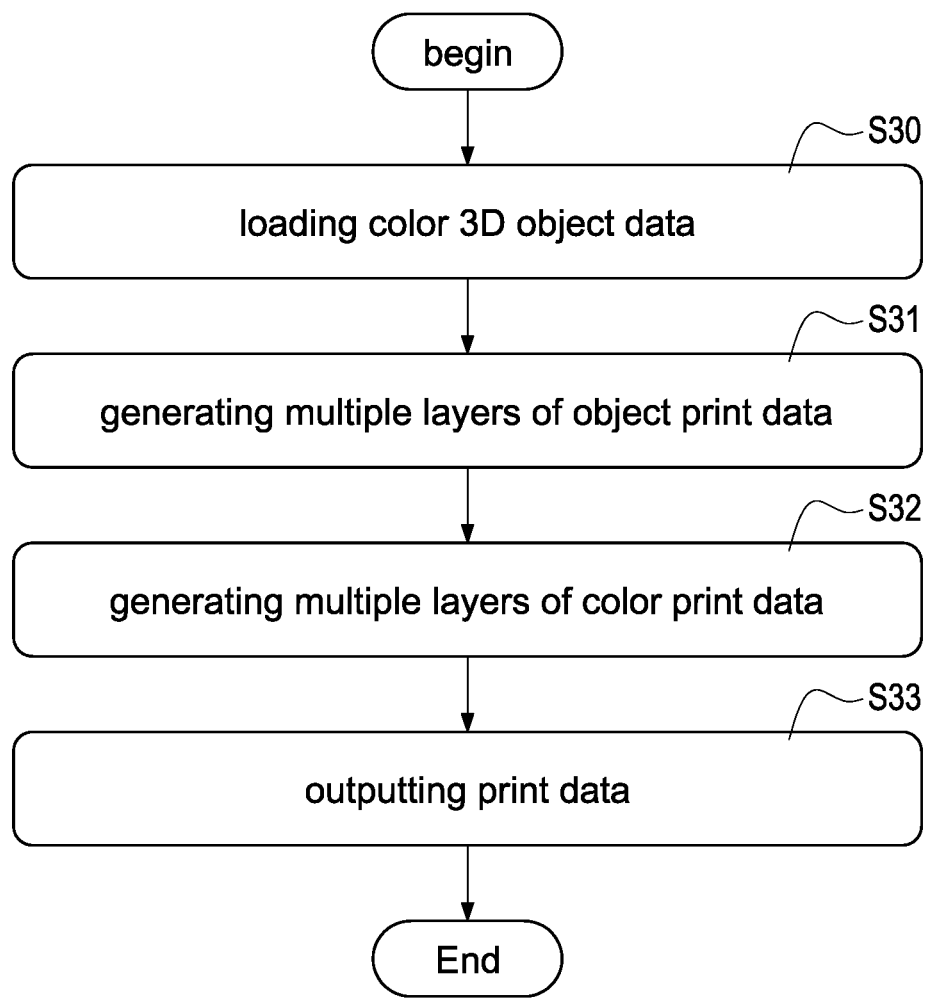
FIG. 5 is a flowchart of slicing process according to a third embodiment of the present disclosed example.

Please refer to FIG. 5, which is a flowchart of slicing process according to a third embodiment of the present disclosed example. In this embodiment, the electronic apparatus 2 or the 3D printer 1 (take the slicing software 20 being executed by the electronic apparatus for example in following description) may first execute the slicing software 20 to execute a slicing process for generating above mentioned multiple layers of the object print data and above mentioned multiple layers of the color print data according to the color 3D object data corresponding to the color 3D object before performing above-mentioned printing process (the steps S10-S15 or the steps S20-S25). The 3D printing method of this embodiment further comprises following steps for executing the slicing process.

Step S30: the electronic apparatus 2 loads pre-stored color 3D object data from the memory above-mentioned color 3D object data is used to express a color 3D object, and records geometric information (coordinate of each vertex or shape of color 3D object) and color information (such as the color value of each part of the color 3D object) of the color 3D object. Furthermore, the electronic apparatus 2 may render the corresponding color 3D object after completion of loading the color 3D object data, and display the rendered color 3D object in the display of the electronic apparatus 2.

Step S31: the electronic apparatus 2 executes an object slicing process on the loaded color 3D object data to generate multiple layers of the object print data. More specifically, during the slicing process, the electronic apparatus 2 generates multiple layers of the object print data according to the geometric information of the color 3D object data. Each of the multiple layers of the object print data comprises a layer number sorted by order respectively, and each of the multiple layers of the object print data is used to express the outline of each layer of the slice object generated by dividing the color 3D object.

One of the exemplary embodiments, each layer of the object print data is a 2D image used to express the outline of each layer of the slice object. The 3D printer 1 may manufacture each layer of the slice physical modes respectively corresponding to each layer of the slice objects after the light module 11 irradiate the stereolithography materials on the curing platform 17 according to the pixel value of each pixel of each layer of the 2D images.

One of the exemplary embodiments, each layer of the object print data (such as a section of g-codes) is used to express a section of printing path of the outline of each layer of the slice object. The 3D printer 1 may manufacture each layer of the slice physical models respectively corresponding to each layer of the slice objects after the light module 11 irradiate the stereolithography materials on the curing platform 17 according to each of printing paths.

Step S32: the electronic apparatus 2 executes color slicing process on the loaded color 3D object data for generating the multiple layers of the color print data. More specifically, the electronic apparatus 2 generates the multiple layers of the color print data according to the color information of the color 3D object data, each layer of the color print data comprises a layer number respectively, and is used to express the colors of each layers of the slice objects generated by dividing the color 3D object respectively.

One of the exemplary embodiments, each layer of the color print data is a color 2D image. The 3D printer 1 may color each position of each layer of the slice physical models after mixing the color inks and jetting the mixed inks according to each layer of the color print data.

One of the exemplary embodiments, if a slice physical model corresponding to any layer of the object print data is not necessary to be colored, the electronic apparatus 2 does not generate the layer of the color print data during the slice process.

Please be noted that a maximum layer number of the multiple layers of the object print data is the same as the maximum layer number of the multiple layers of the color print data. For example, If the color 3D object data may be divided into one hundred layers of slice objects, there are one hundred layers of object print data and one hundred layers of color print data generated after executing the slicing process on the color 3D object data. One hundred layers of object print data respectively correspond to the outlines of one hundred layers of slice objects (range of layer number is 1 to 100). One hundred layers of color print data respectively correspond to the colors of one hundred layers of slice objects (range of layer number is 1 to 100).

Step S33: the electronic apparatus 2 output the multiple layers of the object print data and the multiple layers of the color print data generated by the slicing process, such as transferring the object print data and the color print data to the connection module 13 of the 3D printer 1.

Thus, the present disclosed example can effectively transform the color 3D object data corresponding to the color 3D object into the multiple layers of object print data and the multiple layers of color print data.

Figure 6:
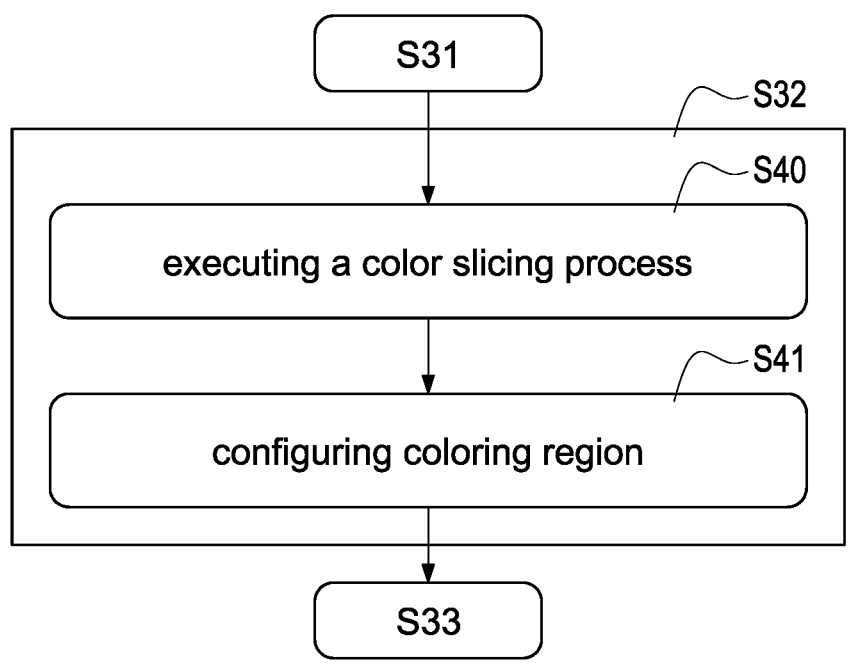
FIG. 6 is a flowchart of a color slicing process according to a fourth embodiment of the present disclosed example.

Please refer to FIG. 5 and FIG. 6 simultaneously, FIG. 6 is a flowchart of a color slicing process according to a fourth embodiment of the present disclosed example. Compare to the embodiment shown in FIG. 5, the step S32 of the slicing process of this embodiment comprises following steps.

Step S40: the electronic apparatus 2 executes a color slicing process on the loaded color 3D object data for generating multiple layers of the color print data.

One of the exemplary embodiments, the electronic apparatus 2 analyzes an external color of each slice object corresponding to each layer of the object print data, and generating the corresponding color 2D image.

Step S41: the electronic apparatus 2 modifies each of the multiple layers of the color print data for configuring a coloring region of each of the multiple layers of the color print data. More specifically, the electronic apparatus 2 may configure area of the coloring region of each of the multiple layers of the color print data according to a position of each layer of the color print data in all of the layers of the color print data.

One of the exemplary embodiments, the electronic apparatus 2 may configure the coloring region of the selected color print data according to area of the slice object corresponding to the adjacent layer (such as the second layer or the second-to-last layer) of the object print data if any layer of the color print data is bottom layer (first layer) or top layer (last layer). Furthermore, the area of the configured color region of the coloring print data is same as the area of the slice object corresponding to the adjacent layer of the object print data.

One of the exemplary embodiments, the electronic apparatus 2 reduces area of the coloring region of the layer of the color print data inside-out if determining that any layer of the color print data is a middle layer.

For example, the electronic apparatus 2 may configure the outside of the upper surface of the corresponding slice object as the coloring region of the layer of the color print data.

Furthermore, according to above solution, the coloring area (as shown in FIG. 10C, the colored stereolithography materials 41 comprising coloring region 410 and hollowed region 411 being the colorless region) and the amount of used color materials (such as inks) are reduced if the control module 10 colors according to the reduced layer of the color print data (such as the colored stereolithography materials 41 shown in FIGS. 9C and 10C).

The above-mentioned are only preferred specific examples in the present disclosed example and are not thence restrictive to the scope of claims of the present disclosed example. Therefore, those who apply equivalent changes incorporating contents from the present disclosed example are included in the scope of this application, as stated herein.

What is claimed is:

1. A stereolithography color 3D printing method applied to a stereolithography color 3D printer (1), the stereolithography color 3D printer (1) comprising a control module (10), a light module (11), a coloring module (12), a drive module (16), a curing platform (17), and a material tank (18), the light module (11) being arranged at least one light spot and configured to irradiate a plurality of different positions of the curing platform (17) by the at least one light spot, the coloring module (12) being arranged at least one inkjet nozzle and configured to color the different positions of the curing platform (17) by the at least one inkjet nozzle, the material tank (18) being used to store stereolithography materials (180), the method comprising following steps of:
    a) loading color 3D object data;
    b) generating multiple layers of object print data according to geometric information of the color 3D object data, wherein each layer of the object print data is a 2D image;

c) generating multiple layers of color print data according to color information of the color 3D object data, wherein each layer of the color print data is a 2D color image;

d) the control module (10) controlling the drive module (16) to lift the curing platform (17) to make the curing platform (17) be under liquid surface of the stereolithography materials (180) in the material tank (18) and make a vertical distance between the liquid surface and the curing platform (17) or one layer of slice physical model (182, 30, 31) last printed be a default height (h);

e) the drive module (16) controlling the light module (11) to adjust luminous flux of each light spot of the light module (11) for irradiating the stereolithography materials (180) at corresponding positions upon the curing platform (17) for curing the stereolithography materials (180) into one layer of the slice physical model (182, 30, 31) according to pixel value of each pixel of one layer of the object print data;

f) the drive module (16) controlling the coloring module (12) to color at corresponding positions of the slice physical model (182, 30, 31) being printed according to the pixel value of each pixel of the same layer of the color print data; and g) performing the step d) to the step f) repeatedly for stacking all of the slice physical models (30', 31') as a color 3D physical model.

2. The stereolithography color 3D printing method according to claim 1, wherein the step c) comprises following steps of:

c1) generating the multiple layers of the color print data according to the color information; and c2) modifying at least one layer of the color print data for reducing area of a coloring region (310) of the color print data.

3. The stereolithography color 3D printing method according to claim 2, wherein the step c2) is configured to reduce the area of the coloring region (310) of the layer of the color print data if the layer of the color print data is a middle layer.

4. A stereolithography color 3D printing method applied to a stereolithography color 3D printer (1), the stereolithography color 3D printer (1) comprising a control module (10), a light module (11), a coloring module (12), a driving module (16), a curing platform (17), and a material tank (18), the light module (11) being arranged at least one light spot and configured to irradiate a plurality of different positions of the curing platform (17) by the at least one light spot, the coloring module (12) being arranged at least one inkjet nozzle and configured to color the different positions of the curing platform (17) by the at least one inkjet nozzle, the material tank (18) being used to store stereolithography materials (180), the method comprising following steps of:

a) loading color 3D object data;

b) generating multiple layers of object print data according to geometric information of the color 3D object data, wherein each layer of the object print data is a 2D image;

c) generating multiple layers of color print data according to color information of the color 3D object data, wherein each layer of the color print data is a 2D color image;

d) controlling the curing platform (17) to lower a default height (h);

e) the drive module (16) controlling the coloring module (12) to color at corresponding positions of stereolithography materials (180) on the curing platform (17) according to pixel value of each pixel of one layer of the color print data;

f) the drive module (16) controlling the light module (11) to adjust luminous flux of each light spot of the light module (11) for irradiating the stereolithography materials (180) at the corresponding positions upon the curing platform (17) for curing the colored stereolithography materials (180, 40, 41) into one layer of the slice physical model (40',41') according to the pixel value of each pixel of one layer of the object print data; and g) performing the step d) to the step f) repeatedly for stacking all of the slice physical models (40', 41') as a color 3D physical model.

5. The stereolithography color 3D printing method according to claim 4, wherein the step c) comprises following steps of:

c1) generating the multiple layers of the color print data according to the color information; and c2) modifying at least one layer of the color print data for reducing area of a coloring region (140) of the color print data.

6. The stereolithography color 3D printing method according to claim 5, wherein the step c2) is configured to reduce the area of the coloring region (410) of the layer of the color print data if the layer of the color print data is a middle layer.

7. The stereolithography color 3D printing method according to claim 4, wherein the step e) is configured to control the coloring module (12) to jetting the stereolithography materials (181, 40, 41) with different colors to the curing platform (17) for coloring.

* * * * *